United States Patent [19]

Fabbiani

[11] Patent Number: 4,889,366
[45] Date of Patent: Dec. 26, 1989

[54] SECURITY DOCUMENT

[76] Inventor: Bruno Fabbiani, Via Feletto, 17, 10155 Torino, Italy

[21] Appl. No.: 67,934

[22] Filed: Jun. 29, 1987

[30] Foreign Application Priority Data

Jul. 1, 1986 [IT] Italy ................................ 67532 A/86

[51] Int. Cl.$^4$ ............................................. B42D 15/00
[52] U.S. Cl. ......................................... 283/86; 283/83; 283/77; 283/904
[58] Field of Search .................... 281/1; 283/1 R, 1 A, 283/62, 77, 86, 87, 112, 904, 83

[56] References Cited

U.S. PATENT DOCUMENTS

| | | | |
|---|---|---|---|
| 573,524 | 12/1896 | McMasters | 283/62 X |
| 4,096,015 | 6/1978 | Kawamata et al. | 283/112 X |
| 4,126,373 | 11/1978 | Moraw | 283/86 X |
| 4,171,864 | 10/1979 | Jung et al. | 283/86 X |
| 4,269,473 | 5/1981 | Flothmann et al. | 283/86 X |
| 4,304,809 | 12/1981 | Moraw et al. | 283/87 X |
| 4,531,765 | 7/1985 | Shulman | 283/904 X |

OTHER PUBLICATIONS

"Sandwich Holography for Sharing Information Interferometrically With a High Degree of Security", *Applied Optics*, Abramson et al, 15 Jun. 1979, vol. 18, No. 12, pp. 2017-2021.

Primary Examiner—Paul A. Bell
Attorney, Agent, or Firm—Kane, Dalsimer, Sullivan, Kurucz, Levy, Eisele and Richard

[57] ABSTRACT

A security document comprising a flat support; one or more portions having identification codes; and a hologram; which hologram presents reference means along the edge, and a protective coating for preventing the hologram from being removed or damaged.

25 Claims, 3 Drawing Sheets

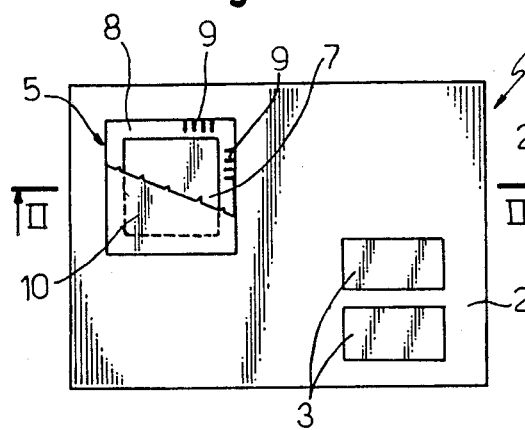
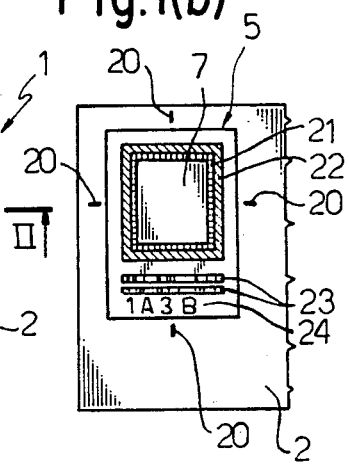
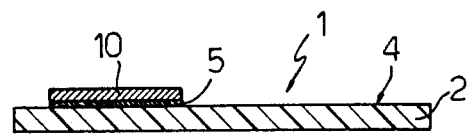
Fig. 2
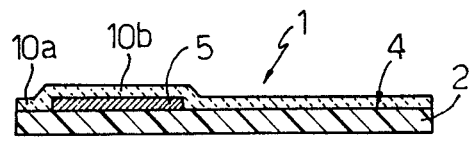
Fig. 3
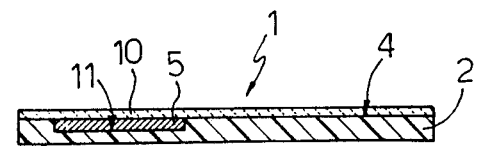
Fig. 4

SECURITY DOCUMENT

BACKGROUND OF THE INVENTION

The present invention relates to a security document, particularly of the type comprising a flat support; one or more identification codes, either optical, magnetic or of any other type; and a hologram.

Security documents (such as passports, credit cards, security passes, etc.) are known to be affixed with holograms, the sole function of which is to enhance the appearance of the document; the authenticity of the hologram generally being checked only macroscopically by means of visual inspection by authorized personnel.

Other known types of security documents present holograms for the other purpose of preventing forgery, and which may be embossed either internally (embossed type) or externally (transfer foil type). Holograms of this sort, however, fail to meet two requirements essential for this type of application:

Protection of the hologram against physical-chemical agents in the environment and mechanical, thermal stress, etc., which may impair the quality of the image. This is particularly essential in cases where the document is checked automatically by devices designed to perform a programmed analysis of all and part of the image.

Preventing the hologram from being removed from the original and affixed to a forged document.

This is the case, in fact, with current types of "embossed" holograms, which may easily be detached from the surface to which they are glued, and affixed to other forged documents.

"Transfer foil" types of holograms, while being preferable to the "embossed" type in that they are secured to a number of supports with a layer of heat-setting adhesive, have a very thin metalized surface layer with no protection and, therefore, very little resistance to bending and abrasion. This inevitably, results in wear and scoring of the holographic diffraction grating and, consequently, loss of data and references during both integral and partial analysis of the original holographic image.

SUMMARY OF THE INVENTION

The aim of the present invention is to provide a security document of the aforementioned type, designed to overcome the drawbacks associated with known types of documents as described briefly above.

With this aim in view, according to the present invention, there is provided a security document comprising a support, at least one identification code, and at least one hologram secured to the said support; characterised by the fact that it comprises one or more protective coatings applied at least on the surface of the said hologram, and reference means on the said hologram for positioning and/or identifying the said document.

BRIEF DESCRIPTION OF THE DRAWINGS

A number of non-limiting embodiments of the present invention will be described by way of examples with reference to the accompanying drawings, in which:

FIG. 1a and FIG. 1b show plan views of a document in accordance with the present invention;

FIG. 2 shows a section along line II—II in FIG. 1;

FIGS. 3 to 6 show sections, similar to that of FIG. 2, of alternative embodiments of the present invention;

DETAILED DESCRIPTION OF THE INVENTION

Figure 5:
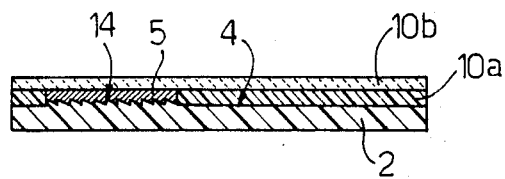

Number 1 in FIGS. 1 and 2 indicates a security document in accordance with the present invention.

Document 1 comprises a flat support 2 conveniently formed from laminated plastic, paper, rolled metal or other flat material. One or more portions 3 of support 2 present codes for identifying the type of document and/or the holder of document 1, which codes may be in the form of writing, or optical, magnetic or other types of codes. On the upper surface 4 of document 1, there is secured a reflection hologram 5 using adhesive, heat-setting adhesive means, etc.

Hologram 5 comprises a centre portion 7, constituting the actual holographic image, and an edge 8. The said edge 8 presents reference means 9 for enabling position of the hologram on to respective support 2, correct positioning of the hologram on a manual or automatic reading device, and identification of the document by the said device.

As shown in FIG. 1a, the said reference means 9 consist of diffraction marks located on at least two perpendicular sides of the said edge 8.

FIG. 1b shows a variation of the FIG. 1a embodiment. In this case, support 2 of hologram 5 presents four macropositioning marks 20 located externally and alongside each edge of hologram 5. Micropositioning and identification of hologram 5 are entrusted to two sets of marks 21, 22 framing centre portion 7 constituting the actual holographic image, and respectively arranged perpendicular and at an angle to the adjacent edge of centre portion 7. Hologram 5 also presents one or more optical bar and/or spot codes 23, and an alpha-numerical code 24; the function of code 23 being to identify the issuing agency of document 1 (e.g. the bank) and therefore define the analysing and/or operating and/or connection sequence of various optoelectronic devices for detecting the authenticity of the hologram; and the function of code 24 being to identify the user (e.g. current account number), or vice versa.

The upper surface of hologram 5 is provided with a uniformly thick protective coating 10 of transparent, flexible, abrasionproof material, such as resin or silicon lacquer.

For the sake of simplicity, the embodiments shown in FIG. 3 onwards will be described using the same reference numbers as in FIGS. 1 and 2.

FIG. 3 shows a solution whereby a first protective coating 10a, conveniently at least as thick as hologram 5, covers the entire upper surface 4 of support 2 with the exception of the portion occupied by hologram 5; and a second protective coating 10b covers hologram 5 itself.

In the FIG. 4 embodiment, support 2 comprises a recess 11 at least as deep as the thickness of hologram 5 and housing hologram 5 itself; and protective coating 10 covers the entire upper surface 4 of document 1.

In the FIG. 5 embodiment, the upper surface 4 of the support 2 comprises an embossed code 14, substantially of the same shape and size as hologram 5, and to which is secured hologram 5, which varies the reflection angle, chromatic dispersion, etc. A first protective coating 10a, substantially as thick as hologram 5, covers the remainder of upper surface 4; and a second protective coating 10b is applied over the said first coating 10a and over hologram 5.

Figure 6:
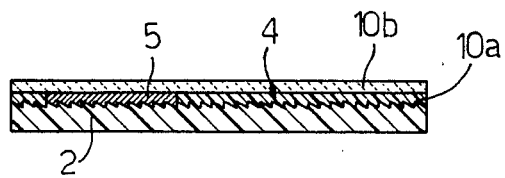

The FIG. 6 embodiment is identical to that of FIG. 5, except that upper surface 4 of support 2 is embossed entirely with forgeproof codes and patterns.

Figure 7:
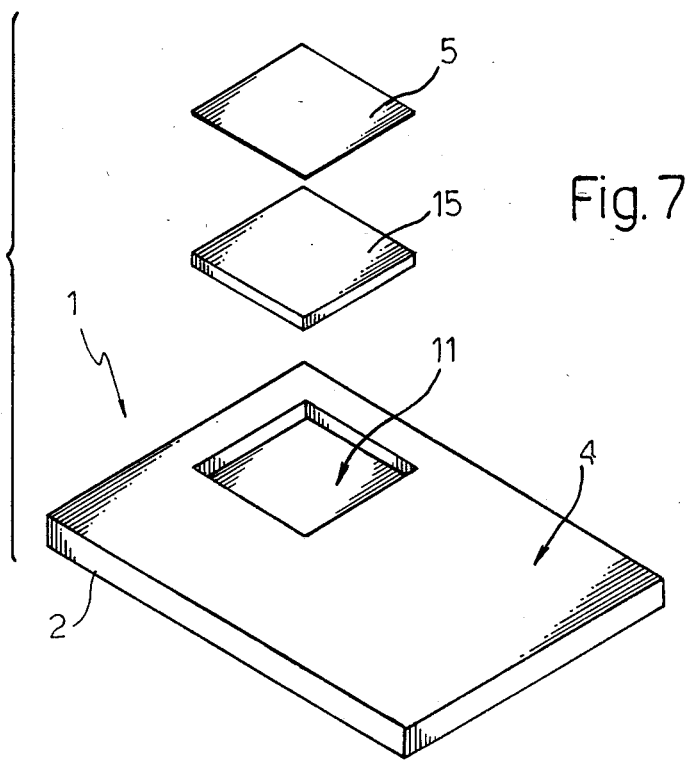
FIGS. 7 and 8 show exploded views in perspective of further embodiments of the present invention.

FIG. 7 shows a security document in accordance with the present invention and comprising a support 2 on the upper surface 4 of which there is formed a recess 11 as shown in FIG. 4. Hologram 5 is transferred on to a plate 15 housed inside the said recess 11, which may contain embossed codes constituting a given optical profile and/or positioning means, and conveniently secured inside the same by means of adhesive resins in such a manner as to prevent it from being detached undamaged from support 2. The protective coating (not shown) may be any one of the types already mentioned.

Figure 8:
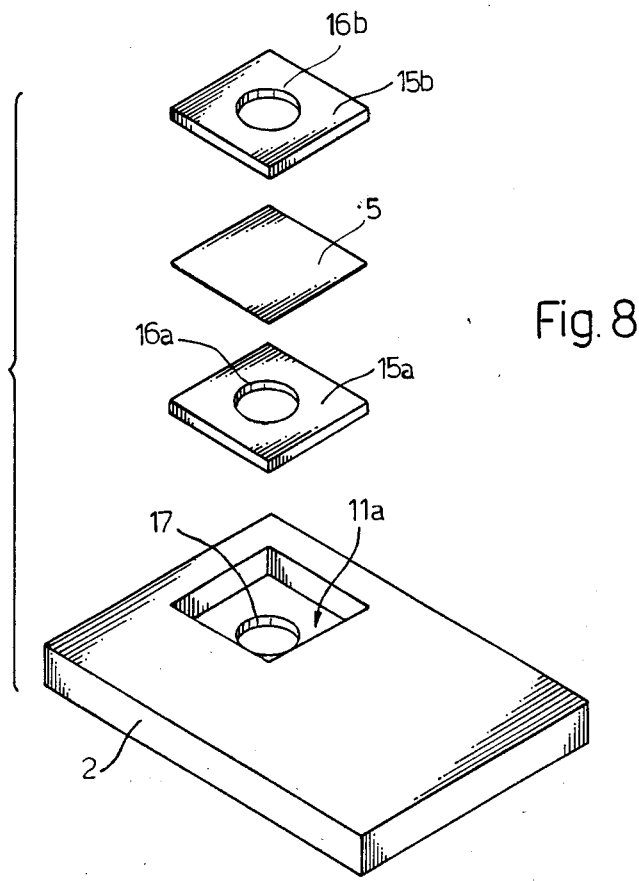

The FIG. 8 embodiment differs from the previous ones by employing a transmission type hologram 5 with protection on one or two sides. In this case, hologram 5 is placed between two plates 15a, 15b having respective centre holes 16a, 16b and housed inside a recess 11a also having a matching centre hole 17 coaxial with the said holes 16a, 16b.

Figures 9A, 9B:
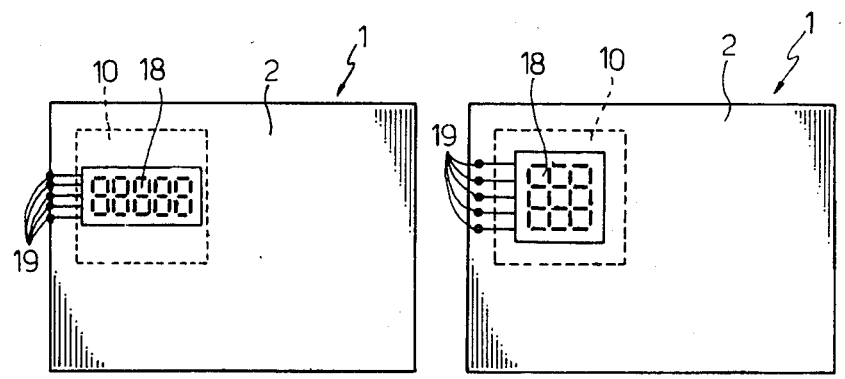
FIG. 9a and FIG. 9b show plan views of a further embodiment of the present invention.

In the embodiment shown in FIGS. 9a, 9b, the forgeproofing function is performed simultaneously by a liquid crystal display 18 and a hologram (not shown) placed on top. Display 18 affects reflection of the holographic image according to a code depending on the display configuration and on penetration, absorption (both achromatic and selectively chromatic), and reflection of the incident ray.

FIG. 9a shows a document 1 with an alphanumerical display 18 supplied by wires connected to electrical contacts 19 on the outer edge of document 1.

The display shown in FIG. 9b is a matrix type with supply contacts 19 located on the surface of the document. Obviously, in this case, protective coating 10 (shown by the dotted line) must be kept clear of contacts 19.

To those skilled in the art it will be clear that changes may be made to the embodiments described herein without, however, departing from the scope of the present invention.

For example, the characteristics of the various component parts of the document may be combined to form different embodiments.

Furthermore, positioning marks 20 may be located inside and/or outside the hologram, and be either printed in ink or formed from magnetic or other material.

At least one of frames 21, 22 may consist of resolving sights with diffraction gratings having groups of equally-or variably-spaced lines for resolution control of the document, or having a laminar or step or preferentially-reflecting structure for reinforcing the diffraction waves and shifting the reflected peak. The said sights may also be inserted inside the holographic image for checking the authenticity of the security document.

Codes 23 may be at least partially replaced by cryptographic codes and/or Fourier transforms.

Reference means 9 and positioning marks 20 may consist of other uneven features in relation to the holographic background, such as diffraction gratings, specular surfaces, inked graphics, embossed diopters, magnetic tracks or points, etc.

As regards FIG. 1, hologram 5 may be placed at least partially over the codes in portions 3, which codes are conveniently of different types.

Plate 15 (FIGS. 7 and 8) and recess 11a (FIG. 8) may be provided with embossed codes and/or positioning means of any type.

Different optical profiles (prismatic, dioptrical, in microrelief according to a given code, etc.) may be formed on support 2, plate 15, or even on the outer surface of protective coatings 10, 10a and 10b.

Document 1 may present holes or slots for cooperating with positioning means (pins, guides, etc.) on the said reading device. Or the said positioning means may simply cooperate with the outer edges of document 1.

Finally, provision may be made for other forgeproofing devices, either optical or other types, e.g. chromatic liquid crystal displays for coded formation of iconographs, etc. over which to place hologram 5.

The display may also be arranged so as to extend beyond the hologram, thus enabling data on the display to be read also. In this case, the protective coating may or may not also cover the projecting portion of the display.

I claim:

1. A security document comprising a support, at least one identification code, at least one hologram secured to said support, one or more protective coatings (10) applied at least on the surface of said hologram (5) having an edge (8), and optically readable reference marking means (9, 20, 21, 22) on said holograph visible to an external source (5) for allowing the positioning of the hologram in a reading device.

2. A security document as claimed in claim 1, characterised by the fact that said hologram (5) comprises at least one reference code (23, 24) for identifying said document (1).

3. A document as claimed in claim 1, characterised by the fact that the said hologram (5) is a reflection type hologram.

4. A document as claimed in claim 1, characterised by the fact that the said hologram (5) is a transmission type holograph.

5. A document as claimed in claim 1, characterized by the fat that the said support (2) comprises a recess (11) for the said hologram (5), said recess being at least as deep as the thickness of the hologram (5).

6. A document as claimed in claim 1, characterised by the fact that the upper surface (4) of the said support (2) is embossed at least on the portion (14) to which the said hologram (5) is secured.

7. A document as claimed in claim 1, characterised by the fact that the said protective coating (10) is at least transparent to electromagnetic radiation of a given wave length, and is flexible and capable of withstanding abrasion.

8. A document as claimed in claim 1, characterised by the fact that the said protective coating (10) fully covers at least one face of the said document (1).

9. A document as claimed in claim 1, characterised by the fact that the said protective coating (10) is of uniform thickness.

10. A document as claimed in claim 1, characterised by the fact that the said protective coating (10) presents a given optical profile.

11. A document as claimed in claim 1, characterised by the fact that a first portion (10a) of the said protective coating (10) covers the said upper surface (4) of the said support (2) with the exception of the said holograph (5); a second portion (10b) of the said protective coating (10) covering at least the said hologram (5).

12. A document as claimed in claim 1, characterised by the fact that the said reference means (9, 21, 22 23, 24) are located on the edge (8) of the said hologram (5).

13. A document as claimed in claim 12, characterized by the fact that the said edge (8) presents referencing means (9) for enabling the positioning in a reading of device the holographic image, which is in the center portion (7).

14. A document as claimed in claim 1, characterized by the fact that the said reference means (9) are marks which diffract light.

15. A document as claimed in claim 1, characterized by the fact that the said reference means (9) comprise at least one resolving sight with diffraction gratings having groups of spaced lines for resolution control of the document.

16. A document as claimed in claim 1, characterized by the fact that it comprises at least one plate (15) to which the said hologram (5) is secured.

17. A document as claimed in claim 16, characterized by the fact that the said plate (15) presents a given optical profile and comprises positioning marks.

18. A document as claimed in claim 16, characterised by the fact that the said plate is secured to the said support (2) by adhesive means.

19. A document as claimed in claim 1, characterised by the fact that the said hologram (5) is arranged between two said plates (15a, 15b) having respective openings (16a, 16b) facing each other; the said support (2) having a recess (11a) for the said plates (15a, 15b), said recess (11a) having an opening (17) facing the said openings (16a, 16b) in the said plates (15a, 15b).

20. A document as claimed in claim 1, characterised by the fact that it comprises further means of avoiding forgery in combination with the said hologram (5).

21. A document as claimed in claim 20, characterised by the fact that the said further forgeproofing means comprise a selectively-chromatic liquid crystal display (18) placed under the said hologram (5).

22. A document as claimed in claim 1, characterised by the fact that it comprises mechanical locating means designed to cooperate with positioning means on a reading device.

23. A document as claimed in claim 1, characterized by the fact that the said reference means (9) comprises at least one resolving sight having laminar structure for reinforcing the diffraction waves and shifting the reflected peak.

24. A document as claimed in claim 1, characterized by the fact that the said reference means (9) comprises at least one resolving sight having a step structure for reinforcing the diffraction waves and shifting the reflected peak.

25. A document as claimed in claim 1, characterized by the fact that the said reference means (9) comprise at least one resolving sight having a preferentially reflecting structure for reinforcing the diffraction waves and shifting the reflected peak.

* * * * *